Nov. 26, 1963   P. H. HOFER   3,111,715
METHOD AND APPARATUS FOR FORMING THERMOPLASTIC FILMS
Filed Sept. 26, 1961
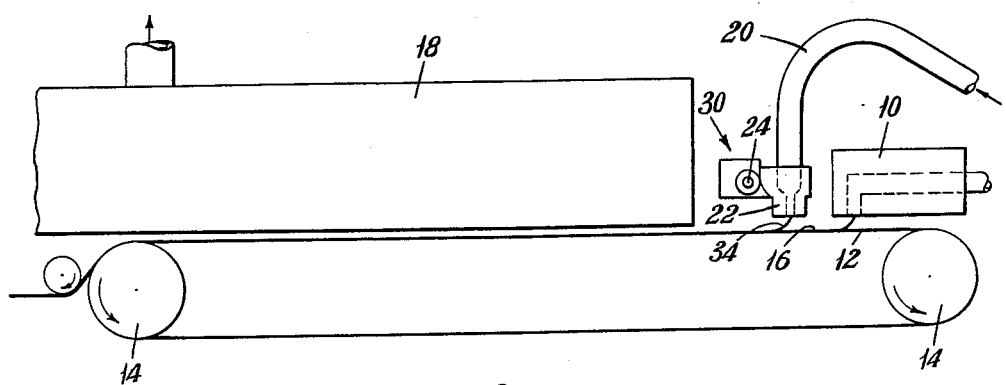
Fig. 1.
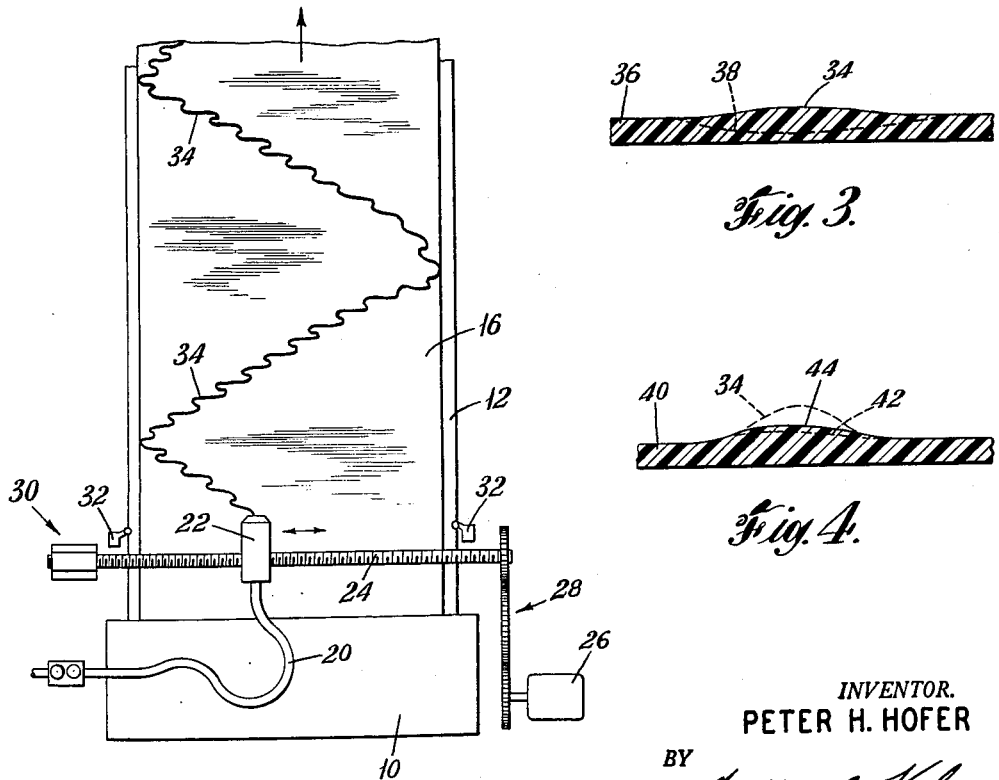
Fig. 2.
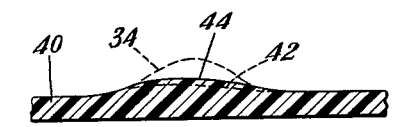
Fig. 3.
Fig. 4.
INVENTOR.
PETER H. HOFER
BY
ATTORNEY United States Patent Office 3,111,715
Patented Nov. 26, 1963

3,111,715
METHOD AND APPARATUS FOR FORMING
THERMOPLASTIC FILMS
Peter H. Hofer, Berkeley Heights, N.J., assignor to Union
Carbide Corporation, a corporation of New York
Filed Sept. 26, 1961, Ser. No. 140,830
7 Claims. (Cl. 18—15)

This invention relates to improvements in method and apparatus for forming thermoplastic films by casting techniques and more particularly to improvements in method and apparatus for forming thermoplastic films which are to be wound on rolls subsequent to casting.

Presently known methods for casting thermoplastic films cast a solution of a thermoplastic resin in an organic solvent from an orifice onto a moving roll or belt, carry the incipient film to a heating zone, remove the solvent from the thermoplastic solution by evaporation in the heating zone and wind the resulting film on a roll. These methods have in common the problem of local variations in film gauge, either ridges or valleys due to a die orifice imperfection, uneven solution flow to the die orifice or nonuniform handling of the incipient film after emergence from the die. Even very slight thickness variations, e.g., 0.00001 inch, cause either soft or hard ridges or valleys depending respectively on whether the variation is to a greater or lesser gauge than the standard gauge.

As the film is rolled on a wind-up roll, these ridges and valleys are superposed with each successive turn of the roll. After several hundred turns or more the distortion is great enough to permanently emboss the film. Upon unwinding this embossing appears as a highly undesirable continuous belly in the film.

It is an object, therefore, of the present invention to provide improvements in presently known film casting methods and apparatus whereby wound thermoplastic film is unaffected by local variations in the film gauge.

The above and other objects of the present invention are accomplished, in general, by adding to the conventional thermoplastic film casting method during the setting of the cast film and simultaneously with or prior to evaporation of the solvent therefrom and prior to winding on a roll, the step comprising selectively increasing the cast film thickness by impinging a column of a solution of the thermoplastic in a substantially continuous traversing pattern on selected narrow areas of said film surface while the film is still wet, i.e., before all the solvent has evaporated.

Apparatus is also provided comprising one or more conduits, positioned over the film supporting surface and between the thermoplastic solution depositing orifice and the film windup assembly. These conduits are constructed and arranged to impinge a column of thermoplastic solution on a surface of the film in a substantially continuous traversing pattern.

The invention will be more fully described hereinbelow in conjunction with the attached drawings wherein:

FIG. 1 is a partly schematic elevational view of a film casting apparatus modified with an embodiment of the improvement of this invention.

FIG. 2 is a plan view of the apparatus shown in FIG. 1.

FIG. 3 is a cross-sectional view of a cast film with additional thermoplastic solution thereon.

FIG. 4 is a cross-sectional view of another cast film with additional thermoplastic solution thereon.

Referring now to the drawings in detail, where like numerals indicate like parts there is shown in FIG. 1 an apparatus for casting thermoplastic film comprising a die orifice 10 which deposits a thermoplastic resin-organic solvent solution onto a continuous polished stainless steel belt 12 supported and driven by rollers 14.

The cast film 16 is drawn away from the die orifice on belt 12. Evaporation of the solvent is accomplished by means of an oven 18 or like apparatus wherein circulating heated air or gas above the cast film facilitates solvent evaporation.

Spaced above the belt 12 is a fluid directing device generally indicated at 30.

The fluid directing device 30 is most clearly shown in FIG. 2. There the cast thermoplastic film 16 is supported by and is drawn away from the die orifice 10 by the belt 12 and while supported is traversed with a column of solution of thermoplastic resin from a fluid directing device which comprises flexible tubing 20 supplied with thermoplastic resin solution preferably from the same source as die orifice 10, or if desired, from a source of a more or less concentrated solution of the same thermoplastic in a, preferably the same, solvent. The nozzle 22 is movably mounted for reciprocal lateral motion on threaded rotating shaft 24 driven by motor 26 and gear train 28. The direction of the nozzle 22 is automatically reversed when the nozzle contacts one of stops 32.

Fluid directing device 30 can be as close to the place of deposition of the film forming solution as desired. As pointed out above, the column of additional thermoplastic solution must be impinged on the film while the additional solution can flow with the incipient film. As a practical matter, the column should be impinged on the incipient film before the film achieves a self-supporting condition.

In general, the method of this invention is carried out by casting a thermoplastic resin solution as flat film on a moving planar surface, immediately impinging on selected narrow areas of the film, a column of additional thermoplastic resin solution in a continuous traversing pattern, while the film is still wet, i.e., still contains sufficient solvent to enable the film surface and the impinging column to flow together, subjecting the cast solution to heat and air movement to evaporate the solvent and make the film self-supporting, and thereafter winding the film on a roll.

The columns of fluid from nozzle 22 impinge on portions of the cast film and thicken these portions of the film as compared with the surrounding film. Because the film is moving away from the die, the column of resin solution with each traverse traces a fresh line across the film surface. The columns of resin solution form bands back and forth across the film surface. The bands are thicker than the surrounding film. The result is a ridge of slightly thicker thermoplastic, a "bead" of increased film thickness indicated at 34 in the drawings across the surface of the film.

Because the bead 34 is substantially continuous, i.e., terminates only possibly at the edge of flat film before retracing its path and traverses a portion of the entire film surface in a uniform manner, it enables a winding of the film without distortion from a local ridge or valley in a particular turn on the wind-up roll. Where there is a local variation in the path of the solution the bead is not linearly increased or decreased. Rather, because the evaporation rate of the film solvent is essentially a function of the square of the thickness, the effect of local variations on the bead is negligibly slight as shown in FIGS. 3 and 4.

In FIG. 3 there is illustrated a film section 36 having a local deficiency of film forming material; hence, there is a valley in the surface, indicated by the dotted line 38. After application of bead 34, the film surface is practically level. In FIG. 4 the defect in the surface of film section 40 is a local excess film-forming material; hence, there is a ridge on the surface, indicated by the lower dotted line 42. After application of bead 34 the film surface is temporarily greatly distorted but as the solvent evaporates and the bead mass settles by gravity, the degree of distortion is reduced to a very slight increase in the original ridge. The final contour of the film surface is shown at 44. FIGS. 3 and 4 show clearly how the thickness of the bead 34 is not uniformly additive to the film thickness, but varies in its amount of thickness addition according to the local thickness of the film substrate. The result is a symmetrically disposed, virtually entirely uniformly thick bead across the film surface, so that upon winding no distortions are caused in the wound film.

The reason that the increase in film thickness is approximately the nominal thickness of the bead when the bead impinges on a local deficiency of film material and yet the increase in the film thickness is considerably less than the nominal thickness of the bead when the bead impinges on a local excess of film material is that the bead mass is added to the film mass. As is well known, a greater mass (a) dries (therefore hardens) slower, or in other words remains at a flowable viscosity longer and (b) tends to level out to a greater extent due to greater gravitational pull. These factors of longer flow time and greater gravitational pull for larger masses combine to give the nonadditive thickness increases of this invention. Thus, when the bead impinges on a local film deficiency the drying and settling rate closely approximates adjacent normally thick, i.e., desired gauge, film material. When the bead impinges on desired gauge film material the total mass (film plus bead) is greater than that of the material deficient film and, therefore, the mass dries slower and settles more than the locally deficient film area. This effect is even more pronounced when the bead impinges on a local excess of film forming material. There the total mass is still greater and the drying rate therefore even slower, with consequent prolonged low viscosity which when combined with increased mass causes more pronounced settling of the bead in the film material and as a consequence a very slight overall thickness increase.

The number and spacing of the nozzles for impinging resin solution are not critical in the present invention. Generally one nozzle is sufficient for cast film fabrication.

Two or more nozzles traveling on spaced apart parallel paths in opposite directions can be employed for a different symmetry of bead pattern.

Factors such as casting solution temperature, solution deposition rate, solvent evaporation and film setting rate, wheel or belt temperature will vary with particular thermoplastics and end product requirements. Dependent on these factors will be drying air velocity and temperature, and the size, shape and distance from the die of the fluid directing means. Width and thickness of the bead can be widely varied by either increasing or decreasing distance and temperature of the column of thermoplastic solution, or selecting solvents of varying compatibilities for the impinging column and the cast film solution. Preferably the bead thickness is about 10 percent of the nominal film thickness. Other either greater or smaller beads can also be applied.

Among the thermoplastic resins which can be used in the practice of the present invention are polymers and copolymers of styrene, ethylene, propylene, ethyl acrylate, vinyl chlorides with one another or with other monomers containing polymer producing unsaturation which are copolymerizable therewith. Any other thermoplastic resin adaptable to casting forming techniques can also be used.

What is claimed is:

1. In a method for forming thermoplastic film comprising casting a solution of a thermoplastic resin from a film-forming die orifice onto a moving planar surface, evaporating the solvent from the solution and winding the resultant cast film on a roll, the improvement which comprises selectively increasing the thickness of a contiguous portion of the cast film surface by impinging a column of thermoplastic resin solution in a substantially continuous traversing pattern on selected narrow contiguous portions of said film surface while said film surface is still wet.

2. In a method for forming thermoplastic film comprising casting a solution of a thermoplastic resin from a film forming die orifice onto a moving planar surface, evaporating the solvent from the solution and winding the resultant cast film on a roll, the improvement which comprises reciprocally laterally moving a fluid directing means over said moving planar surface, impinging from said fluid directing means onto the film on said moving planar surface prior to said film becoming self-supporting a column of thermoplastic resin solution in a substantially continuous traversing pattern on selected narrow contiguous portions of the surface of said film thereby selectively increasing the thickness of contiguous portions of the said film.

3. Method claimed in claim 2 wherein the thermoplastic resin solvents in the film forming solution and the column of thermoplastic resin solution are the same.

4. Method claimed in claim 2 wherein the film forming thermoplastic resin solution and the column of thermoplastic resin solution are the same solution.

5. In apparatus for forming cast thermoplastic film comprising a die having a film forming die orifice, a solvent evaporative means and a film wind-up assembly, the improvement which comprises a fluid directing means positioned between said die and the wind-up assembly, said fluid directing means comprising a nozzle mounted for reciprocal lateral motion which is adapted to impinge a column of thermoplastic solution on the surface of the film after emergence from the die and prior to complete evaporation of the solvent in a substantially continuous traversing pattern.

6. In apparatus for forming cast thermoplastic film comprising a die communicating with a thermoplastic resin solution supply and having a film forming die orifice, a solvent evaporative means and a film wind-up assembly, the improvement which comprises a fluid directing means having a nozzle mounted for reciprocal lateral motion on a driven threaded shaft, said nozzle communicating with a supply of thermoplastic resin solution and being adapted to impinge in a substantially continuous traversing pattern a column of thermoplastic resin from said supply on the surface of the film after emergence from said die orifice and prior to the film becoming self supporting.

7. Apparatus claimed in claim 6 wherein the thermoplastic resin solution supply for the die orifice and the nozzle is the same.

References Cited in the file of this patent

UNITED STATES PATENTS

| | | |
|---|---|---|
| 2,289,774 | Graves | July 14, 1942 |
| 2,405,977 | Peters | Aug. 20, 1946 |